(12) United States Patent
Fukuzawa (10) Patent No.: US 7,960,882 B2
(45) Date of Patent: Jun. 14, 2011

(54) MOTOR

(75) Inventor: Hisashi Fukuzawa, Nagano (JP)

(73) Assignee: Nidec Sankyo Corporation (JP)

( * ) Notice: Subject to any disclaimer, the term of this patent is extended or adjusted under 35 U.S.C. 154(b) by 256 days.

(21) Appl. No.: 12/413,900

(22) Filed: Mar. 30, 2009

(65) Prior Publication Data

US 2009/0243412 A1 Oct. 1, 2009

(30) Foreign Application Priority Data

Mar. 28, 2008 (JP) ................................. 2008-085203

(51) Int. Cl.
*H02K 5/16* (2006.01)
(52) U.S. Cl. ........................................................ 310/90
(58) Field of Classification Search .................. 310/90, 310/405, 425; 384/420, 425, 251
See application file for complete search history.

(56) References Cited

U.S. PATENT DOCUMENTS

| | | | | |
|---|---|---|---|---|
| 6,541,886 | B2 * | 4/2003 | Mayumi | 310/91 |
| 7,420,303 | B2 * | 9/2008 | Nishimura | 310/90 |
| 7,535,141 | B2 * | 5/2009 | Ueno | 310/90 |
| 7,635,935 | B2 * | 12/2009 | Sonohara et al. | 310/90 |
| 7,679,244 | B2 * | 3/2010 | Agematsu | 310/90 |
| 7,768,163 | B2 * | 8/2010 | Kasai | 310/49.05 |
| 7,863,790 | B2 * | 1/2011 | Taruta et al. | 310/90 |
| 2009/0243412 | A1 * | 10/2009 | Fukuzawa | 310/90 |
| 2010/0164314 | A1 * | 7/2010 | Ueno | 310/90 |

FOREIGN PATENT DOCUMENTS

JP 2003-324892 A 11/2003

\* cited by examiner

*Primary Examiner* — Dang D Le
(74) *Attorney, Agent, or Firm* — Cantor Colburn LLP (57) ABSTRACT

A motor may include a bearing for supporting a rotation shaft, a bearing holder which is formed with a bearing holding hole on which the bearing is mounted, and a spring member which is mounted on an outer end face of the bearing holder for urging the bearing toward the rotation shaft. The spring member includes a plurality of hook parts which engages with an inner end face of the bearing holder through an outer peripheral side of the bearing holder, and a portion of the inner end face of the bearing holder is formed with a recessed engaging part with which the plurality of the hook parts is engaged. The recessed engaging part includes a cut-out part which reaches to an aperture edge of the bearing holding hole.

13 Claims, 7 Drawing Sheets

MOTOR

CROSS REFERENCE TO RELATED APPLICATION

The present application claims priority under 35 U.S.C. §119 to Japanese Application No. 2008-085203 filed Mar. 28, 2008, the contents of which are incorporated herein by reference.

FIELD OF THE INVENTION

An embodiment of the present invention may relate to a motor. More specifically, an embodiment of the present invention may relate to a mounting structure of a spring member for urging a bearing toward a shaft end of the rotation shaft.

BACKGROUND OF THE INVENTION

Figure 7A:
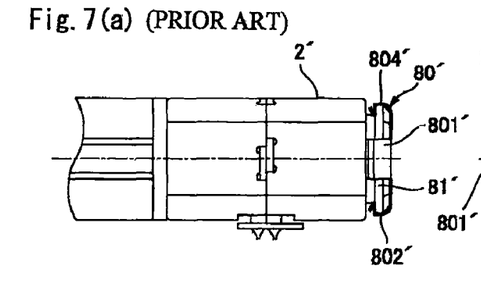
FIGS. 7(a) through 7(f) are explanatory views showing a conventional motor.
Figure 7B:
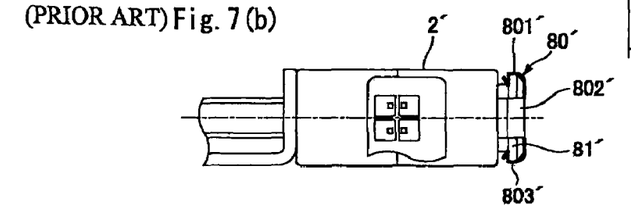
Figure 7C:
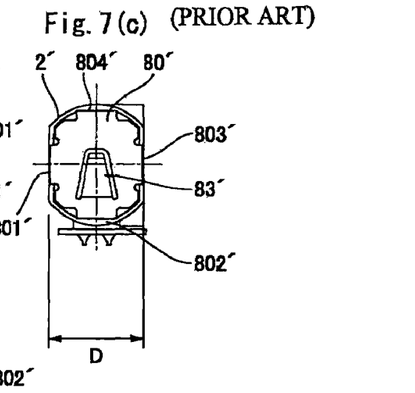
Figure 7D:
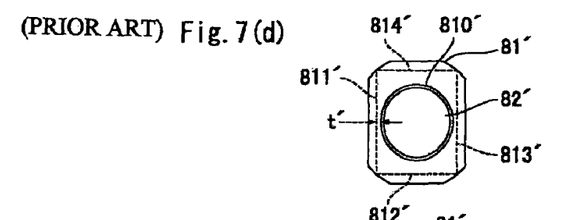
Figure 7E:
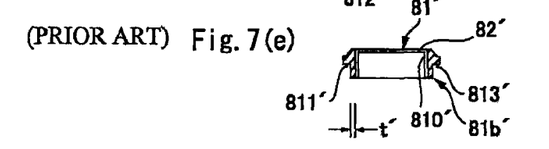
Figure 7F:
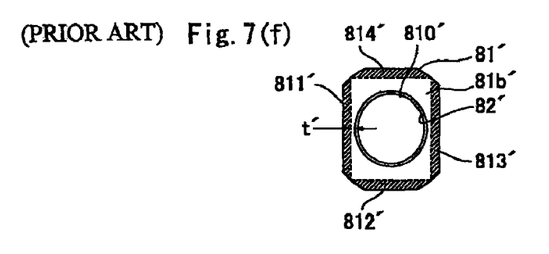

A small stepping motor which is used in a digital camera, a digital video camera, a slim ODD or the like is generally structured as shown in FIGS. 7(a) through 7(f). FIG. 7(a) is a plan view showing an end part of a motor, FIG. 7(b) is its front view, FIG. 7(c) is a side view showing an opposite-to-output side end part of the motor, FIG. 7(d) is an explanatory view showing an opposite-to-output side end face of a bearing holder, FIG. 7(e) is a cross-sectional view showing the bearing holder, and FIG. 7(f) is an explanatory view showing an output side end face of the bearing holder. The motor shown in FIGS. 7(a) through 7(f) includes a case 2' into which a rotor and a coil are accommodated, a bearing 82' which receives a shaft end of a rotation shaft of the rotor on one end side of the case 2', a bearing holder 81' which is provided with a bearing holding hole 810' into which the bearing 82' is inserted. Further, an opposite-to-output side of the bearing holder 81' is disposed with a spring member 80' which is provided with a plate spring part 83' for urging the bearing 82' within the bearing holding hole 810' toward the rotation shaft (see, for example, Japanese Patent Laid-Open No. 2003-324892).

In the stepping motor structured as described above, the case 2' may be formed in a cylindrical shape having a complete round shape when cut in a direction perpendicular to a motor axial line. Alternatively, the case 2' may be formed in an elliptical shape in cross section like an example shown in FIG. 7(c) in order to reduce a thickness dimension in the direction perpendicular to the axial line direction of the motor (thickness dimension in a radial direction). In either case, the spring member 80' is required to be fixed to the bearing holder 81'. Therefore, in the conventional examples, the spring member 80' is formed with four hook parts 801', 802', 803' and 804' which are extended around roughly center portions of outer peripheral side faces of the bearing holder 81' to be engaged with the bearing holder 81'. On the other hand, an output side end face 81b' of the bearing holder 81' is formed with recessed engaging parts 811', 812', 813' and 814' (slanted line regions in FIG. 7(f)), which are thin portions of the bearing holder 81', so as to be engaged with the hook parts 801', 802', 803' and 804'.

In the stepping motor as described above, when a thickness dimension in the direction perpendicular to the axial line direction of motor is reduced, for example, when the dimension "D" shown in FIG. 7(c) is reduced, the minimum width dimension "t" of a wall portion of the bearing holder 81', which is formed between the recessed engaging parts 811', 812', 813' and 814' and the bearing holding hole 810', becomes too narrow and thus the dimension of the bearing holding hole 810' and accuracy of its shape are remarkably deteriorated. On the other hand, when the width dimensions of the recessed engaging parts 811', 812', 813' and 814' are narrowed, an engaging force of the spring member 80' (hook parts 801', 802', 803' and 804') with the bearing holder 81' is lowered. Further, when the entire bearing holder 81' is formed of a thinner portion, a dimension for supporting the bearing 82' in the axial line direction of the motor is shortened to cause the bearing 82' to be inclined carelessly.

SUMMARY OF THE INVENTION

In view of the problems described above, in at least an embodiment of a motor, even when a dimension in the direction perpendicular to the axial line direction of the motor is reduced, a bearing holding hole having a high degree of dimension and shape accuracy for supporting a bearing is obtained without decreasing a support dimension for the bearing in the axial line direction of the motor and without deteriorating an engaging force of the spring member with the bearing holder.

At least an embodiment of a motor may include a bearing which supports a shaft end of a rotation shaft, a bearing holder which is formed with a bearing holding hole on which the bearing is mounted and which penetrates in an axial line direction of the motor, and a spring member which is mounted on an outer end face of the bearing holder for urging the bearing toward the rotation shaft and the outer end face being a face on an opposite side to the rotation shaft. The spring member includes a plurality of hook parts which engages with an inner end face of the bearing holder through an outer peripheral side of the bearing holder, and a portion of the inner end face of the bearing holder with which the plurality of the hook parts is engaged is formed to be a recessed engaging part by forming a thin portion of the bearing holder, and the recessed engaging part includes a cut-out part which reaches to an aperture edge of the bearing holding hole.

According to this embodiment, the portion of the inner end face of the bearing holder with which the plurality of the hook parts is engaged is formed to be a recessed engaging part by forming a thin portion of the bearing holder. Therefore, a dimension of the bearing holder and the spring member in the axial line direction of the motor can be shortened in a state where the spring member is mounted on the bearing holder. Further, the recessed engaging part includes a cut-out part which reaches to an aperture edge of the bearing holding hole. Therefore, even when the hook part is deeply engaged with the bearing holder to enhance an engaging force of the hook part with the bearing holder, a portion having the narrowest width between the bearing holding hole and the recessed engaging part is removed to form the cut-out part and thus a thin portion whose dimension and shape accuracy is easily lowered is not formed at the narrowest portion between the bearing holding hole and the recessed engaging part. Accordingly, the bearing holding hole having a high degree of dimension and shape accuracy can be obtained. Further, the recessed engaging part is partly reached to the aperture edge of the bearing holding hole and thus a part of the bearing holding hole is structured of a thicker wall part of the bearing holder. Therefore, the bearing is supported over a longer dimension in the axial line direction of the motor and thus the bearing does not incline carelessly within the bearing holding hole.

In at least an embodiment of a motor, the cut-out part is formed in a region of ½ or less of the entire circumference of the aperture edge of the bearing holding hole. According to this structure, a portion more than ½ of the entire circumference of the bearing holding hole is structured of a thicker wall part in the bearing holder. Therefore, the ratio of the portion supporting the bearing with a longer dimension in the axial line direction of the motor can be sufficiently secured in the bearing holder and thus the bearing does not incline carelessly.

In at least an embodiment of a motor, the minimum width dimension of a portion except the cut-out part between the bearing holding hole and the recessed engaging part of the bearing holder is 0.2 mm or more when the bearing holder is viewed in the axial line direction of the motor. According to this structure, a sufficient accuracy is obtained and thus accuracy of dimension and shape of the bearing holding hole is not lowered.

In at least an embodiment of a motor, the spring member is mounted on the bearing holder so as to be slid in a direction crossing the axial line direction of the motor. According to this structure, different from a case that an urging member is pressed in the axial line direction of the motor to make the hook part engage, the urging member can be smoothly held by the bearing holder even when a width dimension of the hook part is widened so that the hook part and the bearing holder are deeply engaged with each other. Further, even when a force in the axial line direction of the motor is applied to the urging member for causing the urging member to be separated from the bearing holder, positional displacement, falling or the like of the urging member does not occur.

In this case, it is preferable that a guide part for guiding the hook part when the spring member is made to slide is formed by utilizing at least a part of a stepped part that is formed through the recessed engaging part on the inner end face of the bearing holder. According to this structure, the spring member is easily mounted on the bearing holder by sliding the spring member in the direction crossing the motor axial line.

Further, it is preferable that a middle portion in a slide direction of the recessed engaging part is formed with the cut-out part which reaches to the aperture edge of the bearing holding hole, and the cut-out part is formed at a portion passing through a center of the bearing holding hole in a direction perpendicular to the slide direction. According to this structure, the thinnest portion between the recessed engaging part and the bearing holding hole is formed to be the cut-out part and thus deterioration of dimension and shape accuracy of the bearing holding hole can be prevented.

Further, it is preferable that the recessed engaging part includes a straight portion which is linearly extended to be parallel to the slide direction, and that the straight portion includes a rear side straight part which is located on a rear side in the slide direction and a front side straight part which is located on a front side in the slide direction, and that the rear side straight part and the front side straight part are formed at separated positions from each other so as to have the cut-out part therebetween. In addition, it is preferable that a width dimension at the straight portion of the recessed engaging part in the direction perpendicular to the slide direction is set to be narrower than a width dimension of a portion of the recessed engaging part where the cut-out part is formed, and that the bearing is located on an inner side of the straight portion in the direction perpendicular to the slide direction.

Further, it is preferable that the spring member includes a spring part which is cut in a tongue-like shape and is extended in the slide direction, and that the spring part presses the bearing at a position which is shifted in the slide direction from a center axial line of the bearing. As described above, when the spring part presses the bearing at a position which is shifted in the slide direction from the center axial line of the bearing, the spring part presses the bearing to the side where the cut-out part is not formed. Therefore, the bearing is supported by a portion of the bearing holder which supports the bearing in a longer dimension in the axial line direction of the motor and thus the bearing is supported stably. Further, it is preferable that the cut-out part is formed larger so as to reach to the bearing holding hole on an opposite side in the slide direction which is shifted from the center axial line of the bearing where the spring part is abutted, and that the bearing is urged by the spring part in a state where a lateral pressure is applied to the bearing holding hole on a side of the slide direction.

In at least an embodiment of a motor, the guide part is extended to be parallel to a sliding direction of the spring member. According to this structure, the spring member is easily made to slide and mount on the bearing holder in a direction crossing to the motor axial line.

In at least an embodiment of a motor, the guide part is formed on a rear end side in a slide direction of the spring member. According to this structure, when the spring member is made to slide on the bearing holder in the direction crossing to the motor axial line, the spring member can be positioned securely.

In at least an embodiment of a motor, the spring member is mounted on the bearing holder from the axial line direction of the motor.

Other features and advantages will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2(d) is a front view showing a state where the spring member is mounted on the bearing holder which is viewed from a direction shown by the arrow "B1" in FIG. 2(b).

DETAILED DESCRIPTION OF THE PREFERRED EMBODIMENTS

At least an embodiment of a motor will be described below with reference to the accompanying drawings. In the following description, a side where a rotation shaft of a motor is protruded is referred to as "output side (tip end side)" and an opposite side to the side where the rotation shaft of the motor is protruded is referred to as "opposite-to-output side (base end side)". At least an embodiment of a bearing structure may be applied to either of the output side (tip end side) and the opposite-to-output side (base end side) of the rotation shaft. In the following description, an example will be described in which at least an embodiment of a bearing structure is applied to the opposite-to-output side (base end side) of the rotation shaft.

First Embodiment

Figures 1A, 1B, 1C:
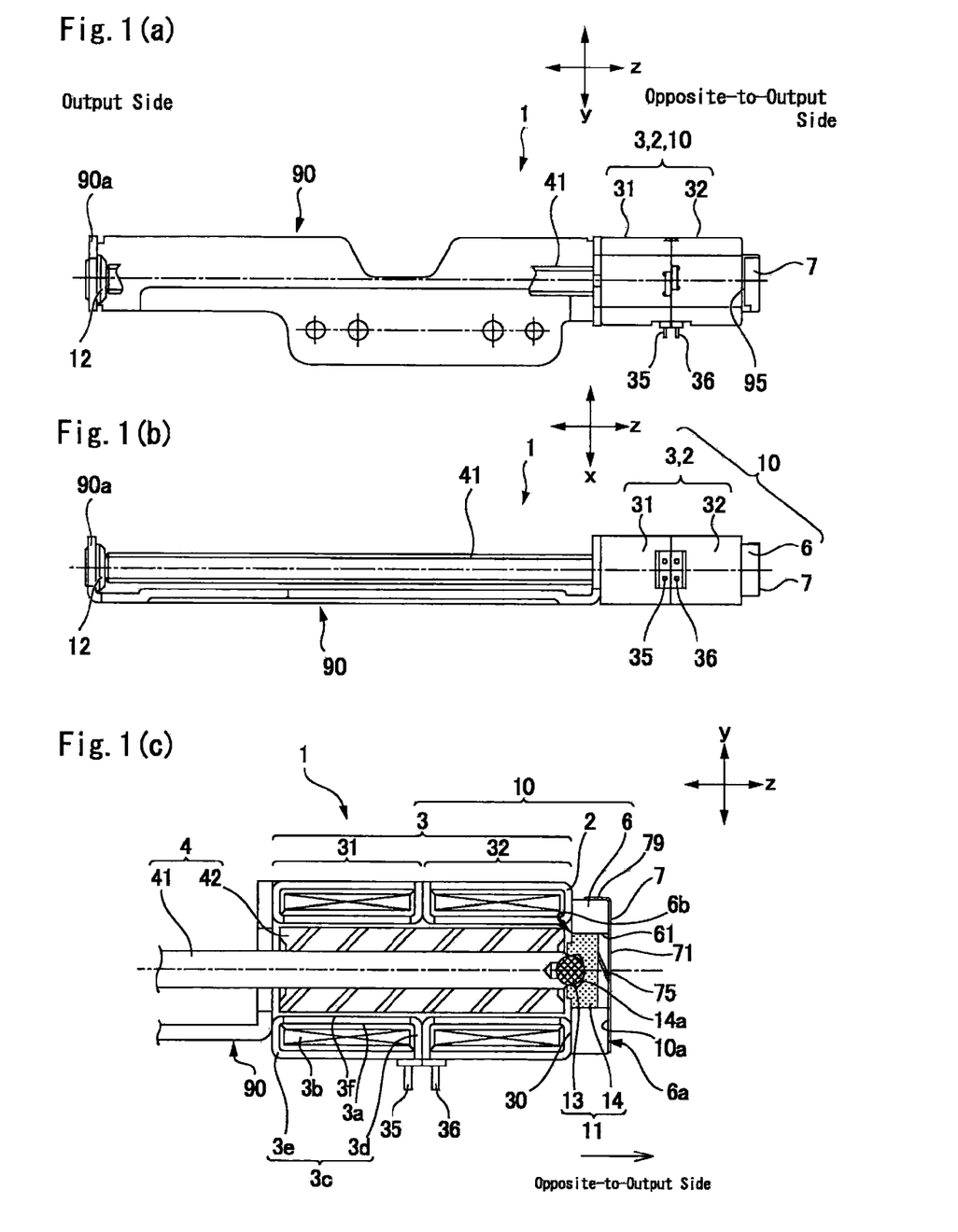
FIG. 1(a) is a plan view showing a motor in accordance with a first embodiment of the present invention.
FIG. 1(b) is its front view.
FIG. 1(c) is a cross-sectional view showing an opposite-to-output side of the motor.
Figure 2A:
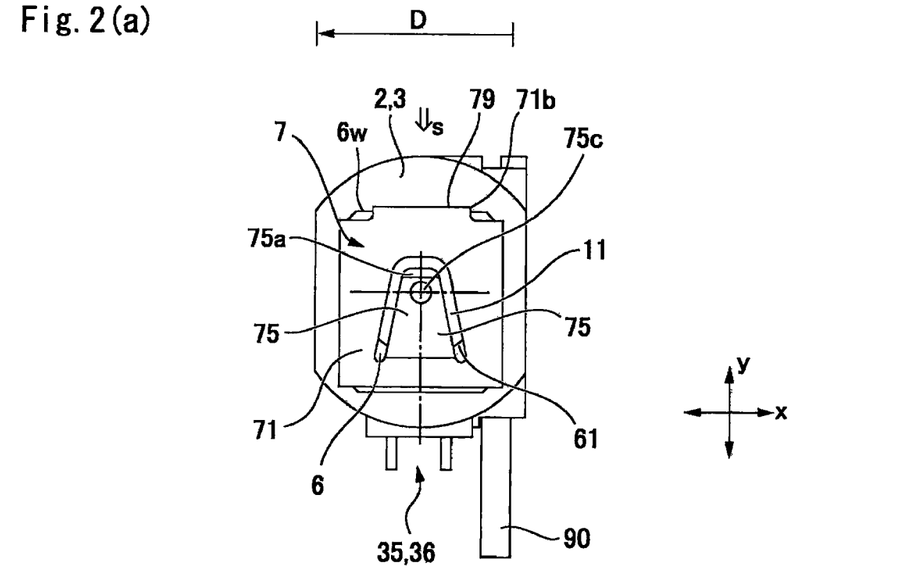
FIG. 2(a) is a side view showing the motor in accordance with the first embodiment of the present invention which is viewed from the opposite-to-output side.
Figure 2B:
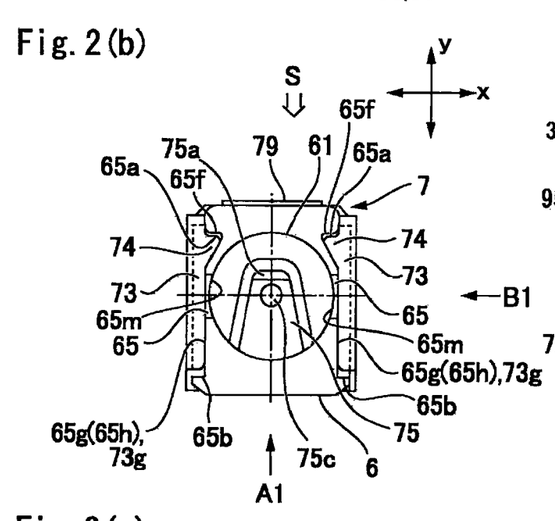
FIG. 2(b) is an explanatory view showing a state where a spring member is mounted on a bearing holder which is viewed from an output side.
Figure 2C:
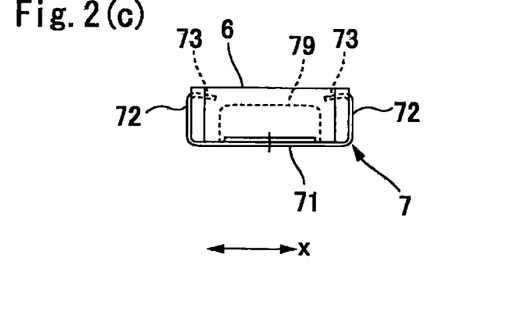
FIG. 2(c) is a bottom view showing a state where the spring member is mounted on the bearing holder which is viewed from a direction shown by the arrow "A1" in FIG. 2(b).

FIG. 1(a) is a plan view showing a motor in accordance with a first embodiment of the present invention, FIG. 1(b) is its front view, and FIG. 1(c) is a cross-sectional view showing an opposite-to-output side of the motor FIG. 2(a) is a side view showing the motor in accordance with the first embodiment of the present invention which is viewed from the opposite-to-output side. FIG. 2(b) is an explanatory view showing a state where a spring member is mounted on a bearing holder which is viewed from an output side. FIG. 2(c) is a bottom view showing a state where the spring member is mounted on the bearing holder which is viewed from a direction shown by the arrow "A1" in FIG. 2(b). FIG. 2(d) is a front view showing a state where the spring member is mounted on the bearing holder which is viewed from a direction shown by the arrow "B1" in FIG. 2(b).

As shown in FIGS. 1(a) through 1(c) and FIG. 2(a), a motor 1 in this embodiment is a small stepping motor which is used in a digital camera, a digital video camera or the like. The motor 1 is provided with a ring-shaped stator 3 in which stator assemblies 31 and 32 provided with a ring-shaped coil 3b wound around an insulator 3a and a pair of stator cores 3c disposed on both sides in an axial direction of the coil 3b are superposed on each other in the axial line direction ("z" direction) of the motor. The stator core 3c is structured of an inner core 3d and an outer core 3e and is provided with a number of pole teeth 3f which is arranged along an inner circumferential face of the coil 3b. Further, the pole teeth 3f which are respectively formed in a pair of the stator cores 3c are alternately disposed in a circumferential direction of the coil 3b. In two outer cores 3e located on the most outer sides in the axial direction, portions of the outer cores 3e which are located on outer peripheral sides with respect to the coils 3b structure a case 2. Terminal parts 35 and 36 are formed on outer peripheral sides of the stator assemblies 31 and 32 and coil ends of the coils 3b are connected to the terminal parts 35 and 36.

The stator 3 is formed in an elliptical shape in cross section when viewed from the axial line direction of the motor, in which a pair of side face parts facing each other are formed in a flat face and other side face parts are formed in a circular arc shape, in other words, the stator 3 is provided with a longer diameter direction and a shorter diameter direction.

A rotor 4 which is structured so that a rotor magnet 42 is mounted on an outer peripheral face on the opposite-to-output side of the rotation shaft 41 is disposed on an inner side of the ring-shaped stator 3. An "S"-pole and an "N"-pole are alternately disposed in a circumferential direction on an outer peripheral face of the rotor magnet 42. Both shaft ends of the rotation shaft 41 are rotatably supported by bearings 11 and 12. The bearing 11 is structured of a ball 13 made of metal or ceramic, a part of which is entered into a recessed part on an opposite-to-output side shaft end of the rotation shaft 41, and a disk-shaped bearing main body 14 made of resin which is provided with a bottomed recessed part 14a for receiving the ball 13.

The opposite-to-output side of the stator 3, which is opposite to the side where the rotation shaft 41 is extended (output side/tip end side), is disposed with roughly rectangular bearing holder 6 that is provided with a bearing holding hole 61 and a spring member 7 provided with a spring part 75. The bearing 11 (bearing main body 14) is inserted into the bearing holding hole 61 of the bearing holder 6 so as to be movable in the axial line direction of the motor ("z" direction). Further, a spring part 75 extending within the bearing holding hole 61 is abutted with a rear end face of the bearing 11 to urge the bearing 11 toward the rotation shaft 41.

A frame 90 having a "U"-shaped cross section is fixed to an end face of the tip end side of the stator 3. The bearing 12 for receiving a tip end side shaft end of the rotation shaft 41 is held by an opposite plate part 90a of the frame 90 which faces the stator 3 with a certain distance.

First, a schematic mounting structure of the spring member 7 on the bearing holder 6 in the motor 1 in this embodiment will be described below with reference to FIGS. 2(a) through 2(d).

As described with reference to FIGS. 1(a) through 1(c) and FIG. 2(a), in this embodiment, a fixed body 10 is structured of the stator 3 (stator assemblies 31 and 32) surrounding the rotor 4 and the bearing holder 6 which is fixed to the opposite-to-output side end face 30 of the stator 3 by a method such as welding. The spring member 7 is mounted on the opposite-to-output side of the fixed body 10.

In order to mount the spring member 7 on the opposite-to-output side (bearing holder 6) of the fixed body 10, in this embodiment, as shown in FIG. 1(a), in a state where the bearing holder 6 has been fixed to the opposite-to-output side of the stator 3, a pair of engaging grooves 95 is formed in a direction so as to cross the axial line direction ("z" direction) of the motor on both sides facing each other in the right and left direction ("x" direction), which is perpendicular to the axial line direction ("z" direction) so that open ends are directed to the same direction (upper direction).

As shown in FIGS. 1(a) through 1(c) and FIGS. 2(a) through 2(d), the spring member 7 is a metal plate member which is machined in a predetermined shape. The spring member 7 is provided with a bottom face part 71 having a spring part 75 that is cut and obliquely bent in a tongue-like shape, a pair of side plate parts 72 which are bent from respective right and left side edge parts facing each other of the bottom face part 71, and a pair of hook parts 73 which are bent on inner sides from respective tip ends of the pair of the side plate parts 72.

Therefore, in a case that the spring member 7 is to be mounted on the bearing holder 6, as shown by the arrow "s", when the spring member 7 is slid in the direction perpendicular to the axial line direction of the motor, the bottom face part 71 of the spring member 7 is overlapped on the outer end face 6a of the bearing holder 6, which is an opposite side to the side where the rotation shaft 41 is located, and the pair of the hook parts 73 are entered from the open end sides into and engaged with the pair of the engaging grooves 95. In this case, the spring member 7 is made to slide so that the root portion of the spring part 75 is located on the front side and thus the spring part 75 is not caught by the bearing holder 6.

In this embodiment, the pair of the engaging grooves 95 is formed of the opposite-to-output side end face 30 of the stator 3 and the recessed engaging part 65 which is formed on the inner end face 6b of the bearing holder 6 that is superposed on the opposite-to-output side end face 30 of the stator 3 (end face of the bearing holder 6 where the rotation shaft 41 is located). A pair of the recessed engaging parts 65 is formed by a thin portion of the bearing holder 6 at edge parts facing each other of the inner end face 6b of the bearing holder 6.

When the bearing holder 6 is fixed to the opposite-to-output side of the stator 3, the recessed engaging part 65 structures the engaging groove 95 shown in FIG. 1(*a*) and FIG. 2(*d*) between the opposite-to-output side end face 30 of the stator 3 and the recessed engaging part 65.

In the motor 1 in this embodiment, in order to realize the mounting structure of the spring member 7 which is described with reference to FIGS. 1(*a*) through 1(*c*) and FIGS. 2(*a*) through 2(*d*), the spring member 7 is provided with a structure described below with reference to FIGS. 3(*a*) through 3(*c*).

Figure 3A:
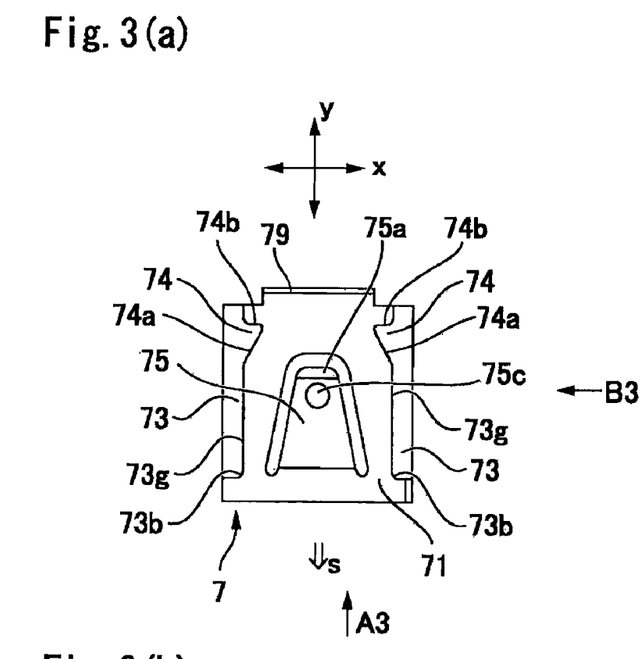
FIG. 3(a) is an explanatory view showing a spring member 7 used in a motor in accordance with the first embodiment of the present invention which is viewed from the output side.
Figure 3B:
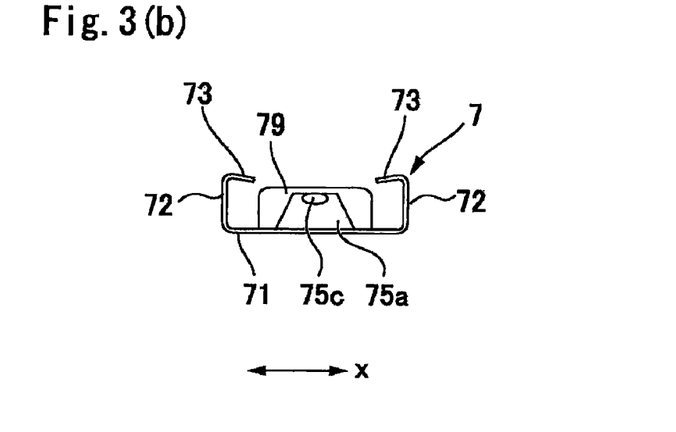
FIG. 3(b) is an explanatory view showing the spring member which is viewed from a direction shown by the arrow "A3" in FIG. 3(a).
Figure 3C:
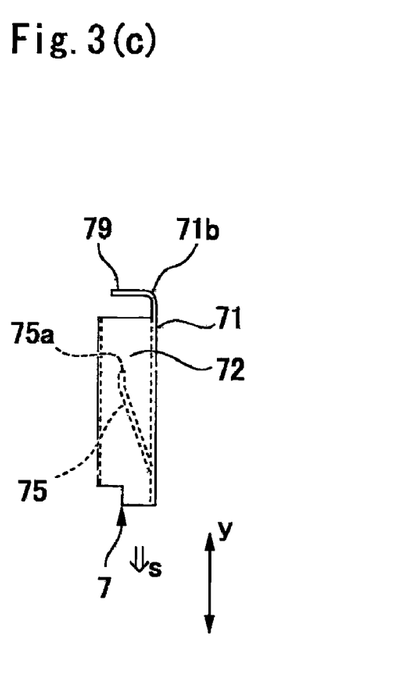
FIG. 3(c) is an explanatory view showing the spring member which is viewed from a direction shown by the arrow "B3" in FIG. 3(a).

FIG. 3(*a*) is an explanatory view showing the spring member 7 used in the motor in accordance with the first embodiment of the present invention which is viewed from the output side. FIG. 3(*b*) is an explanatory view showing the spring member 7 which is viewed from a direction shown by the arrow "A3" in FIG. 3(*a*). FIG. 3(*c*) is an explanatory view showing the spring member which is viewed from a direction shown by the arrow "B3" in FIG. 3(*a*).

As shown in FIGS. 2(*a*) through 2(*d*) and FIGS. 3(*a*) through 3(*c*), the spring member 7 is provided with the bottom face part 71 formed in a roughly rectangular plate shape, a pair of the right and left side plate parts 72 which are bent at both edge parts of the bottom face part 71 in the right and left direction ("x" direction) which is perpendicular to the axial line direction of the motor ("z" direction), and a pair of the hook parts 73 which are bent on inner sides each other from the respective tip end parts of the pair of the side plate parts 72. In the spring member 7, the sides where the hook parts 73 are formed are the shorter diameter direction of the motor.

In this embodiment, the pair of the side plate parts 72 are bent in a substantially perpendicular manner to the bottom face part 71. Further, both of the pair of the hook parts 73 are bent a little larger than a right angle with respect to the side plate part 72 and an angle defined by the side plate part 72 and the hook part 73 is set to be an acute angle.

The bottom face part 71 is formed with the spring part 75 which is cut in a plate spring shape and is obliquely bent at a center portion of the bottom face part 71. A tip end part 75a of the spring part 75 is slightly bent so as to be roughly parallel to the bottom face part 71. The spring part 75 structured as described above presses the bearing 11 at a position which is shifted from the center axial line of the bearing 11 so as to prevent rattling of the bearing 11 and thus the bearing 11 is held within the bearing holding hole 61 in a posture in which the bearing 11 is slightly inclined by the clearance. Further, the spring part 75 is formed with a small hole 75c which is located at the center of the opposite-to-output side end face of the bearing 11. Therefore, even when a gate for resin-forming the bearing 11 is located at the center of the opposite-to-output side end face of the bearing 11 to occur a burr at the center of the opposite-to-output side end face of the bearing 11, the spring part 75 presses the position where the burr is avoided.

An upper end side in a vertical direction ("y" direction) of the bottom face part 71 which is perpendicular to the axial line direction ("z" direction) of the motor is formed with a protruded part 71b at a center portion in a widthwise direction. A plate-shaped stopper part 79 which is bent toward the tip end side in the axial line direction of the motor is formed from the protruded part 71b. The stopper part 79 is bent substantially perpendicular to the bottom face part 71.

Both of a pair of the hook parts 73 of the spring member 7 are provided with a straight line part 73g having a substantially equal width dimension from a lower end side to a midway position on an upper end side in the vertical direction ("y" direction) which is perpendicular to the axial line direction of the motor ("z" direction). Further, both of a pair of the hook parts 73 are formed with a roughly triangular protruded part 74 which is protruded in an inner side direction at a position near its upper end (rear end side position in a slide direction "s"). The protruded part 74 is formed in a roughly triangular shape where a front side 74a in the slide direction "s" is set to be an acute angle to the slide direction "s". For example, the roughly triangular shape is formed so that the front side 74a in the slide direction "s" is an oblique side of about 30° (degree) to the slide direction "s" and a rear side 74b is a side having a right angle with respect to the slide direction "s". Further, a corner part 73b on the front end side in the slide direction "s" of the hook part 73 is formed in an "R" shape.

FIG. 4(*a*) is an explanatory view showing the bearing holder 6 used in the motor in accordance with t which is viewed from the opposite-to-output side. FIG. 4(*b*) is an explanatory view showing the bearing holder 6 which is viewed from a direction shown by the arrow "A4" in FIG. 4(*a*). FIG. 4(*c*) is an explanatory view showing the bearing holder 6 which is viewed from a direction shown by the arrow "B4" in FIG. 4(*a*). FIG. 4(*d*) is an explanatory view showing the bearing holder 6 which is viewed from the output side.

In FIG. 4(*a*) through 4(*d*), the bearing holder 6 is made of SUS and is formed in a roughly rectangular shape, and the bearing holding hole 61 comprised of a through hole into which the bearing 11 is inserted and, which is described with reference to FIG. 1(*c*), is formed at its roughly center position. At least an embodiment of the bearing holder 6 may be formed by using iron system metal or other metal or resin.

An outer end face 6a of the bearing holder 6 which is located on an opposite side to the stator 3 is formed with a shallow recessed part 66 which is extended along the "y" direction around the bearing holding hole 61 over a wide area. The recessed part 66 is formed in a region including a moving trajectory of the spring part 75 when the spring member 7 is slid. Therefore, when the spring member 7 is made to slide, the spring part 75 does not contact with the outer end face 6a of the bearing holder 6 with a strong force.

Figure 4A:
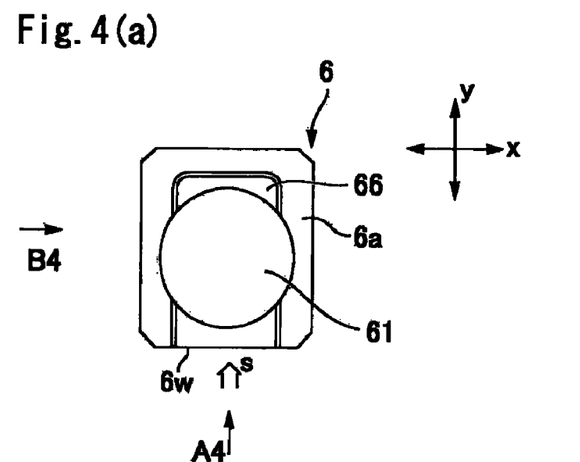
FIG. 4(a) is an explanatory view showing a bearing holder used in a motor in accordance with the first embodiment of the present invention which is viewed from the opposite-to-output side.
Figure 4B:
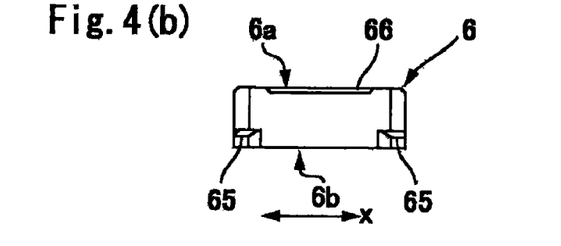
FIG. 4(b) is an explanatory view showing the bearing holder which is viewed from a direction shown by the arrow "A4" in FIG. 4(a).
Figure 4C:
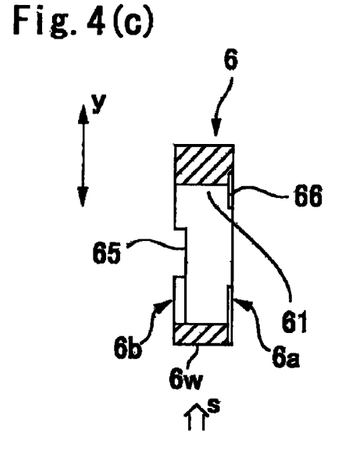
FIG. 4(c) is an explanatory view showing the bearing holder which is viewed from a direction shown by the arrow "B4" in FIG. 4(a).
Figure 4D:
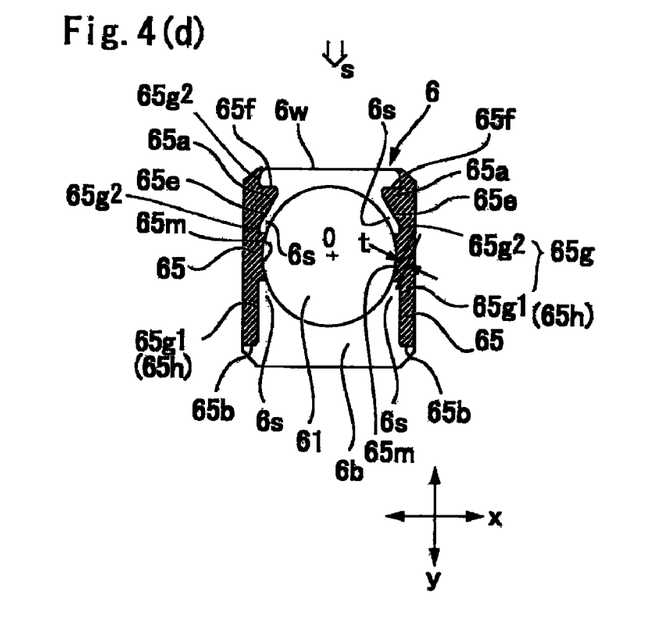
FIG. 4(d) is an explanatory view showing the bearing holder which is viewed from the output side.

The inner end face 6b of the bearing holder 6 which is superposed on the opposite-to-output side end face 30 of the stator 3 (see FIG. 1(c)) is formed with a pair of the recessed engaging parts 65 (region having slanted lines in FIG. 4(d)) which are extended in the vertical direction ("y" direction) along both edge portions on both sides in the right and left direction ("x" direction) through thin portions of the bearing holder 6. Therefore, as shown in FIG. 1(c), when the bearing holder 6 is superposed on the stator 3 so that the opposite-to-output side end face 30 of the stator 3 is abutted with the inner end face 6b of the bearing holder 6, as shown in FIG. 1(a), a pair of the right and left engaging grooves 95 is formed by a pair of the right and left recessed engaging parts 65 between the opposite-to-output side end face 30 of the stator 3 and the inner end face 6b of the bearing holder 6.

In FIG. 4(d), a pair of the recessed engaging parts 65 is extended from an upper end edge portion in the "y" direction to a midway position toward a lower end side. Therefore, both of upward end parts of a pair of the engaging grooves 95 are formed in an open end and their lower end sides are closed by end parts 65b of the recessed engaging parts 65.

A pair of the recessed engaging parts 65 is formed with straight portions 65g which is linearly extended in parallel to the slide direction "s". More specifically, the recessed engaging part 65 is structured of a rear end side straight line part 65g1, which is located on the rear end side in the slide direction "s" (lower end side in the "y" direction), and a front end side straight line part 65g2 which is located on the front end side in the slide direction "s" (upper end side in the "y" direction). The rear end side straight line part 65g1 and the front end side straight line part 65g2 are formed at separated positions between which a cut-out part 65m described below is provided. In addition, widths of their upper end sides (front end side in the slide direction "s") of the recessed engaging part 65 are widened in the right and left direction through triangular portions 65a having a roughly triangular planar shape. In this embodiment, the triangular portion 65a is provided with substantially the same shape as the protruded part 74 formed in the hook part 73. The triangular portion 65a is formed in a roughly triangular shape in which a front side 65e in the slide direction "s" is set to be an acute angle to the slide direction "s". For example, the roughly triangular shape is formed so that the front side 65e in the slide direction "s" is an oblique side of about 30° (degree) with respect to the slide direction "s" and a rear side 65f is a side having a right angle with respect to the slide direction "s". Therefore, as described with reference to FIGS. 2(a) through 2(d), when the spring member 7 is made to slide to move the hook parts 73 of the spring member 7 within the engaging grooves 95, the protruded parts 74 of the hook parts 73 are fitted to the triangular portions 65a of the recessed engaging parts 65.

In this case, in the rear end side of the slide direction "s", the stepped parts 65h, which are linearly extended in parallel to the slide direction "s" and which are formed by the straight portions 65g in a pair of the recessed engaging parts 65 (the rear end side straight line part 65g1 and the front end side straight line part 65g2), function as a guide part to the spring member 7. In other words, since the moving range of the straight line part 73g of the hook part 73 of the spring member 7 is restricted by the stepped part 65h, the straight line part 73g of the hook part 73 of the spring member 7 does not protrude on an inner peripheral face side of the bearing holding hole 61 through the cut-out part 65m. In other words, the bearing main body 14 facing the cut-out part 65m is located on the inner side in the radial direction with respect to the straight portion 65g of the recessed engaging part 65 and thus the hook part 73 of the spring member 7 does not contact with the bearing main body 14. In this embodiment, the narrowest portion 6s which is located on the front end side in the slide direction "s" also structures the stepped part 65h which functions as the guide part for the spring member 7.

In the bearing holder 6 structured as described above, a pair of the recessed engaging parts 65 is formed so that a width dimension of a middle portion in the slide direction "s" (near boundary portion between the straight portion 65g and the triangular portion 65a) is widened toward the bearing holding hole 61 to reach to an aperture edge of the bearing holding hole 61 and thus the recessed engaging part 65 is reached to a part of the aperture edge of the bearing holding hole 61. Specifically, the cut-out part 65m is formed at least at a portion passing through the center "O" of the bearing holding hole 61 in the direction (X-direction) perpendicular to the slide direction. In other words, the cut-out part 65m is formed at the thinnest portion between the recessed engaging part 65 and the bearing holding hole 61. Therefore, the portion of the aperture edge of the bearing holding hole 61 where the recessed engaging part 65 is reached is formed as the cut-out part 65m which is recessed by the depth dimension of the recessed engaging part 65 in the axial line direction of the motor Accordingly, when the inner end face of the bearing holder 6 is viewed in plane, there is no thin portion between the bearing holding hole 61 and the recessed engaging part 65 and thus the minimum width dimension "t" of the narrowest portion 6s between the bearing holding hole 61 and the recessed engaging part 65 may be set 0.2 mm or more. Further, the portion of the aperture edge of the bearing holding hole 61 where the recessed engaging part 65 is reached (portion of the cut-out part 65m) may be set in ½ or less of the entire circumference of the aperture edge of the bearing holding hole 61, or preferably ⅓ or less. In addition, the width dimension of the straight portion 65g (the rear end side straight line part 65g1 and the front end side straight line part 65g2) of the recessed engaging part 65 in the direction (X-direction) perpendicular to the slide direction is set narrower than the width dimension of the portion where the cut-out part 65m is formed. In other words, the bearing main body 14 which is located at the cut-out part 65m does not protrude on the outer side in the radial direction with respect to the straight portion 65g, i.e., the bearing main body 14 is disposed on the inner side in the radial direction than the straight portion 65g and thus contacting of the spring member 7 with the bearing main body 14 is avoided and the size in the radial direction of the bearing holder 6 can be reduced.

As shown in FIG. 1(a), when the motor 1 in this embodiment is to be manufactured, after the stator 3 and the rotor 4 have been assembled, the frame 90 is fixed to the stator 3. Alternatively, the stator 3 may be completed after the frame 90 and the case 2 are fixed to each other by welding or the like. Next, the rotor 4 is inserted into the inner side of the stator 3 and the tip end side shaft end of the rotation shaft 41 is supported by the bearing 12 and, in this state, the bearing holder 6 is fixed to the opposite-to-output side end face 30 of the stator 3 so as to be superposed on each other. As a result, the engaging groove 95 is formed between the stator 3 and the bearing holder 6 through the recessed engaging part 65 formed in the inner end face 6b of the bearing holder 6. Spot welding, for example, may be utilized for the above-mentioned fixing and three or four projections for spot welding may be formed on the inner end face 6b of the bearing holder 6 around the bearing holding hole 61.

Next, the ball 13 is mounted through the bearing holding hole 61 and the bearing main body 14 is mounted on the bearing holder 6, and the bearing 11 is disposed within the bearing holding hole 61.

Next, the spring member 7 is made to slide in a direction crossing the axial line direction of the motor ("z" direction).

In this embodiment, as shown by the arrow "s", the spring member 7 is made to slide from an upper side in the vertical direction ("y" direction) which is perpendicular to the axial line direction of the motor ("z" direction) and a pair of the hook parts 73 is made to slide into a pair of the engaging grooves 95 from their open end sides. In this case, the corner part 73b on the front end side of the hook part 73 in the slide direction "s" is formed in the "R" shape and thus the hook part 73 moves the inside of the engaging groove 95 without being caught.

The spring member 7 is made to slide until the stopper part 79 is abutted with the upper end part 6w of the bearing holder 6 and the tip end part of the hook part 73 is abutted with the end part 65b of the recessed engaging part 65 (front end of the engaging groove 95). As a result, the protruded part 74 of the hook part 73 is fitted into the triangular portion 65a of the recessed engaging part 65 (recessed part of the engaging groove 95). In this case, the protruded part 74 of the hook part 73 and the triangular portion 65a of the recessed engaging part 65 (recessed part of the engaging groove 95) are formed in a similar triangular shape to each other and thus the protruded part 74 of the hook part 73 is fitted into the triangular portion 65a of the recessed engaging part 65 smoothly.

In this state, the bottom face part 71 of the spring member 7 overlaps the outer end face 6a of the bearing holder 6 and the spring part 75 urges the bearing 11 toward the rotation shaft 41. This state is maintained by means of that, when the spring member 7 is made to slide, the hook part 73 is elastically deformed and the bearing holder 6 is elastically clamped between the bottom face part 71 and the hook part 73. Further, the side plate part 72 is also elastically deformed and a returning force to its original shape acts as a force for maintaining the state where the spring member 7 is held by the bearing holder 6. In addition, in the state where the protruded part 74 of the hook part 73 is fitted into the triangular portion 65a of the recessed engaging part 65, the stopper part 79 is abutted with and elastically deformed by the upper end part 6w of the bearing holder 6. Therefore, the stopper part 79 causes the spring member 7 to slide in the reverse direction to the mounting direction but this movement is prevented by means of that the roughly triangular shaped protruded part 74 of the hook part 73 is fitted into the triangular portion 65a of the recessed engaging part 65 (recessed part of the engaging groove 95). In this case, in the rear end side in the slide direction, the stepped part 65h which is formed through the straight portion 65g of the bearing holder 6 functions as a guide part for the spring member 7 and thus the spring member 7 is positioned appropriately without being inclined.

Through the above-mentioned steps, as shown in FIGS. 1(a) through 1(c) and FIG. 2(a), the spring member 7 is mounted on the opposite-to-output side of the fixed body 10.

As described above, in the motor 1 in this embodiment, when the spring member 7 is to be mounted on the fixed body 10 (bearing holder 6), the spring member 7 is made to slide in the direction crossing the axial line direction of the motor to overlap the bottom face part 71 of the spring member 7 on the opposite-to-output side end face 10a of the fixed body 10 and a pair of the hook parts 73 are made to insert into a pair of the engaging grooves 95 from their open ends and to engage therewith. Therefore, different from a case that the urging member 7 is pressed in the axial line direction of the motor to be engaged with the fixed body 10, the urging member 7 can be firmly held even when a large space for engaging the urging member 7 is not secured because of miniaturization of the motor 1 or, like this embodiment, even when the bearing holder 6 is too thin to secure a portion for engaging with the urging member 7. Accordingly, even when a force in the axial line direction of the motor is applied to the urging member 7 for causing the urging member 7 to be separated from the fixed body 10 in the state where the urging member 7 is mounted on the fixed body 10, positional displacement, falling or the like of the urging member 7 does not occur.

Further, the engaging groove 95 whose space is narrow is utilized for engaging with the hook part 73. Therefore, in the state where the urging member 7 has been mounted on the fixed body 10, even when a force in the axial line direction of the motor is applied to the spring member 7 so as to separate from the fixed body 10 and then the side plate parts 72 are pressed to be widened toward outer sides, the hook parts 73 are abutted with the opposite-to-output side end face 10a of the fixed body 10. As a result, the hook parts 73 are not disengaged from the engaging grooves 95.

Further, the side plate parts 72 and the hook parts 73 are formed to be bent in the urging member 7. In this case, the hook parts 73 are bent to a slightly larger angle than the perpendicularity and thus, in the state where the urging member 7 is mounted on the bearing holder 6, the hook parts 73 are elastically deformed largely to provide a large elastic return force. Therefore, the urging member 7 is firmly held on the bearing holder 6 and thus positional displacement or falling of the urging member 7 does not occur.

In addition, in the state where the protruded parts 74 of the hook parts 73 are fitted to the triangular portions 65a of the recessed engaging parts 65 (recessed part of the engaging groove 95), the stopper part 79 is abutted with the upper end part 6w of the bearing holder 6 to be elastically deformed. Therefore, the stopper part 79 acts to make the urging member 7 slide in a direction reverse to the fitting direction but this movement is prevented by engagements of the protruded parts 74 of the hook parts 73 with the triangular portions 65a of the recessed engaging parts 65 (recessed parts of the engaging grooves 95). As a result, the position in the slide direction of the urging member 7 is not shifted.

In addition, the spring part 75 of the urging member 7 is cut in a tongue piece shape from the bottom face part 71 and obliquely bent. When the urging member 7 is to be mounted on the bearing holder 6, the urging member 7 is made to slide so that the root portion of the spring part 75 is located on its front side. Therefore, the spring part 75 is not caught by the bearing holder 6 to be prevented from being plastically deformed. Further, the outer end face 6a of the bearing holder 6 is formed with a shallow recessed part 66 over a region including the moving trajectory of the spring part 75 when the urging member 7 is made to slide. Therefore, when the urging member 7 is made to slide, the spring part 75 is securely prevented from being strongly abutted with the outer end face 6a of the bearing holder 6 and from being deformed plastically.

In addition, the portions of the inner end face 6b of the bearing holder 6 with which two hook parts 73 of the spring member 7 are engaged are formed as the recessed engaging parts 65 which are formed through thin portions of the bearing holder 6. Therefore, in the state where the spring member 7 is mounted on the bearing holder 6, the dimension of the bearing holder 6 and the spring member 7 occupied in the axial line direction of the motor is shortened.

Further, the recessed engaging part 65 with which the hook part 73 is engaged is reached to a part in the circumferential direction of the aperture edge of the bearing holding hole 61 to form the cut-out part 65m at the aperture edge of the bearing holding hole 61. Therefore, in a case that the dimension "D" in the shorter diameter direction of the motor 1 (see FIG. 2(a)) is reduced, even when the hook part 73 is largely engaged with the bearing holder 6 to enhance the engaging force of the hook part 73 with the bearing holder 6, a thin portion extending in the axial line direction of the motor is not formed between the bearing holding hole 61 and the recessed engaging part 65. Accordingly, a high degree of accuracy in the dimension and the shape of the bearing holding hole 61 is obtained. In other words, in the portion of the inner end face 6*b* of the bearing holder 6 between the bearing holding hole 61 and the recessed engaging part 65, the dimension of the narrowest width of the portion 6*s* (minimum width dimension "t" of the portion between the bearing holding hole 61 and the recessed engaging part 65) is 0.2 mm or more. When the minimum width dimension "t" is set to be this value or more, sufficient dimensional accuracy and shape accuracy can be obtained and thus accuracy for dimension and shape of the bearing holding hole 61 is not lowered. Accordingly, even when the dimension "D" in the shorter diameter direction of the motor 1 is further reduced, the bearing 11 in the bearing holder 6 and the spring member 7 can be held securely.

Further, the recessed engaging part 65 is partly reached to the aperture edge of the bearing holding hole 61. Therefore, portions except the cut-out parts 65*m* in the entire circumference of the bearing holding hole 61 are formed with a larger thickness portion whose dimension in the axial line direction of the motor is set to be longer in the bearing holder 6 and thus a support dimension of the bearing holder 6 to the bearing 11 is set to be longer even though it is partial. Therefore, the bearing 11 is supported within the bearing holding hole 61 over a longer dimension in the axial line direction of the motor and thus the bearing 11 does not carelessly incline within the bearing holding hole 61. Especially, in this embodiment, the portions of the cut-out parts 65*m* where the recessed engaging parts 65 are reached to the aperture edge of the bearing holding hole 61 are set to be ½ or less of the entire circumference of the aperture edge of the bearing holding hole 61 and thus the portion more than ½ of the entire circumference of the bearing holding hole 61 is structured of a thicker wall part of the bearing holder 6. Therefore, the bearing 11 within the bearing holder 6 is supported by the thicker wall part of the bearing holder 6 with a sufficiently longer dimension in the axial line direction of the motor and thus the bearing 11 does not incline carelessly.

In other words, in this embodiment, in order to prevent rattling of the bearing 11, the spring part 75 of the spring member 75 presses the bearing 11 at the position shifted from the center axial line of the bearing 11 so that the bearing 11 is held within the bearing holding hole 61 in the posture that the bearing 11 is slightly inclined by the clearance. In this case, according to this embodiment, the appropriate inclined posture of the bearing 11 can be maintained securely. Further, when the spring part 75 of the spring member 75 is structured to press the center axial line of the bearing 11, the bearing 11 is held within the bearing holding hole 61 in the posture where its center axial line is coincided with or parallel to the motor axial line. Also in this case, according to this embodiment, the appropriate posture of the bearing 11 can be maintained securely.

In addition, in this embodiment, the recessed part 66 which is formed on the outer end face 6*a* of the bearing holder 6 is reached to the bearing holding hole 61. However, the portion where the recessed engaging part 65 is reached to the bearing holding hole 61 to form the cut-out part 65*m* and the portion where the recessed part 66 is reached to the bearing holding hole 61 are shifted each other when viewed from the axial line direction of the motor. Therefore, in comparison with a case that the portion where the recessed engaging part 65 is reached to the bearing holding hole 61 to form the cut-out part 65*m* and the portion where the recessed part 66 is reached to the bearing holding hole 61 are overlapped each other when viewed from the axial line direction of the motor, according to this embodiment, the bearing 11 is supported within the bearing holding hole 61 over a longer dimension in the axial line direction of the motor even when the cut-out part 65*m* is formed. Therefore, the bearing 11 can be securely prevented from carelessly inclining within the bearing holding hole 61.

Second Embodiment

FIGS. 5(*a*) through 5(*d*) are explanatory views showing the bearing holder 6 which is used in a motor in accordance with a second embodiment of the present invention. FIG. 5(*a*) is an explanatory view showing the bearing holder 6 which is viewed from the opposite-to-output side. FIG. 5(*b*) is an explanatory view showing the bearing holder 6 which is viewed from a direction shown by the arrow "A5" in FIG. 5(*a*). FIG. 5(*c*) is an explanatory view showing the bearing holder 6 which is viewed from a direction shown by the arrow "B5" in FIG. 5(*a*). FIG. 5(*d*) is an explanatory view showing the bearing holder 6 which is viewed from the output side. Since the basic structure of the second embodiment is similar to the first embodiment, the same notational symbols are used for common portions in the drawing and their descriptions are omitted. Further, the motor 1 in the second embodiment is different from the first embodiment only in the structure of the bearing holder 6 and thus the structure of the bearing holder 6 will be principally described below.

As shown in FIGS. 5(*a*) through 5(*d*), similarly to the first embodiment, the inner end face 6*b* of the bearing holder 6 which is used in the motor 1 in the second embodiment is formed with a pair of recessed engaging parts 65 which are extended in the vertical direction ("y" direction) along both edges in the right and left direction ("x" direction) through thin portions of the bearing holder 6 whose thickness in the axial line direction of the motor is made thinner. Therefore, similarly to the first embodiment, the spring member 7 is mounted on the bearing holder 6 by means of that the hook parts 73 of the spring member 7 described with reference to FIGS. 3(*a*) through 3(*c*) are engaged with the recessed engaging parts 65.

In this embodiment, a width dimension of the recessed engaging part 65 is widened toward the bearing holding hole 61 over a wider range compared with the first embodiment and the recessed engaging part 65 is reached to a part of the aperture edge of the bearing holding hole 61 for form the cut-out part 65*m*. Also in this case, the portion where the recessed engaging part 65 is reached to the aperture edge of the bearing holding hole 61 (portion of the cut-out part 65*m*) is set to be about ¹⁄₂.₅ of the entire circumference of the aperture edge of the bearing holding hole 61, which is less than ½.

In addition, similarly to the first embodiment, a pair of recessed engaging parts 65 is formed with straight portions 65*g* which are linearly extended in a parallel manner to the slide direction "s". More specifically, the straight portion 65*g* is structured of a rear end side straight line part 65*g*1, which is located on the rear end side in the slide direction "s" (lower end side in the "y" direction) and a front end side straight line part 65*g*2 which is located on the front end side in the slide direction "s" (upper end side in the "y" direction). The rear end side straight line part 65*g*1 and the front end side straight line part 65*g*2 are formed at separate positions where a cut-out part 65*m* is disposed therebetween. Therefore, on the rear end sides in the slide direction "s" of a pair of the recessed engaging parts 65, a stepped part 65*h* which is formed by the straight portion 65*g* (the rear end side straight line part 65*g*1 and the front end side straight line part 65g2) so as to linearly extend in a parallel manner to the slide direction "s" functions as a guide part for the spring member 7. In other words, since the moving range of the straight line part 73g of the hook part 73 of the spring member 7 is restricted by the stepped part 65h, the straight line part 73g of the hook part 73 of the spring member 7 does not protrude on the inner peripheral side of the bearing holding hole 61 through the cut-out part 65m and thus the straight line part 73g of the spring member 7 does not contact with the bearing main body 14. Further, the width dimension of the straight portion 65g (the rear end side straight line part 65g1 and the front end side straight line part 65g2) of the recessed engaging part 65 in the direction (X-direction) perpendicular to the slide direction is set narrower than the width dimension of the portion where the cut-out part 65m is formed. In other words, the face of the bearing main body 14 which is located at the cut-out part 65m does not protrude on the outer side in the radial direction with respect to the straight portion 65g, i.e., the face of the bearing main body 14 is disposed on the inner side in the radial direction with respect to the straight portion 65g and thus contacting of the spring member 7 with the bearing main body 14 is avoided and the size in the radial direction of the bearing holder 6 can be reduced.

Further, in the portion of the inner end face 6b of the bearing holder 6 between the bearing holding hole 61 and the recessed engaging part 65, a width dimension of the narrowest portion 6s (minimum width dimension "V" of the portion between the bearing holding hole 61 and the recessed engaging part 65) is set to be more than 0.2 mm or more.

As described above, even in this embodiment, the recessed engaging part 65 with which the hook part 73 is engaged is reached to a part in the circumferential direction of the aperture edge of the bearing holding hole 61 to form the cut-out part 65m. Therefore, even when the hook part 73 is largely engaged with the bearing holder 6 to enhance the engaging force of the hook part 73 with the bearing holder 6, a thin portion extending in the axial line direction of the motor is not formed between the bearing holding hole 61 and the recessed engaging part 65 and thus a high degree of accuracy in the dimension and the shape of the bearing holding hole 61 is obtained. In other words, in the portion of the inner end face 6b of the bearing holder 6 between the bearing holding hole 61 and the recessed engaging part 65, the dimension of the narrowest width of the portion 6s (minimum width dimension "t" of the portion between the bearing holding hole 61 and the recessed engaging part 65) is 0.2 mm or more. When the minimum width dimension "t" is set to be this value or more, since sufficient accuracy in dimension and shape can be obtained, accuracy in dimension and shape of the bearing holding hole 61 is not lowered. In other words, similar effects to the first embodiment is obtained.

Figure 5A:
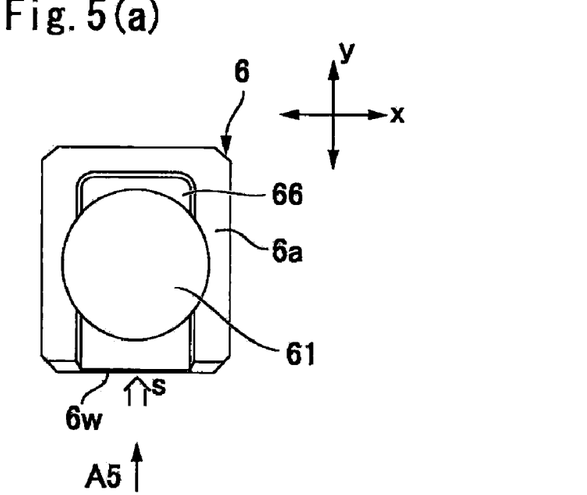
FIG. 5(a) is an explanatory view showing a bearing holder used in a motor in accordance with a second embodiment of the present invention which is viewed from the opposite-to-output side.
Figure 5B:
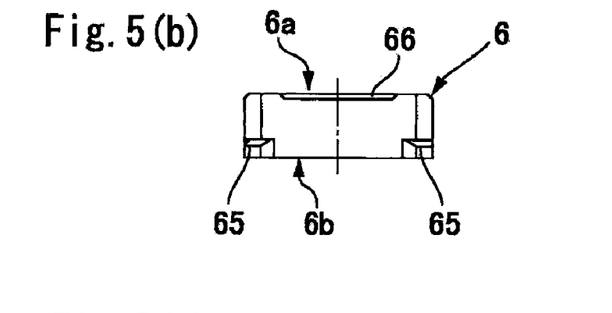
FIG. 5(b) is an explanatory view showing the bearing holder which is viewed from a direction shown by the arrow "A5" in FIG. 5(a).
Figure 5C:
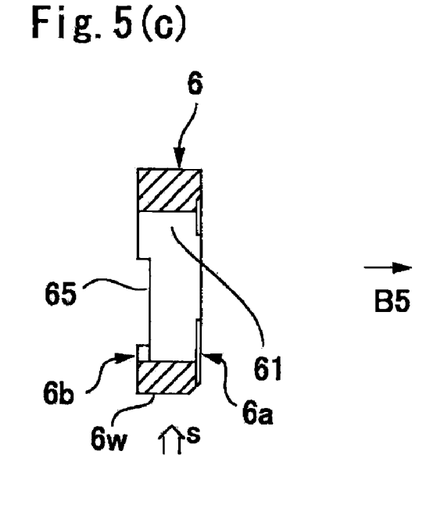
FIG. 5(c) is an explanatory view showing the bearing holder which is viewed from a direction shown by the arrow "B5" in FIG. 5(a).
Figure 5D:
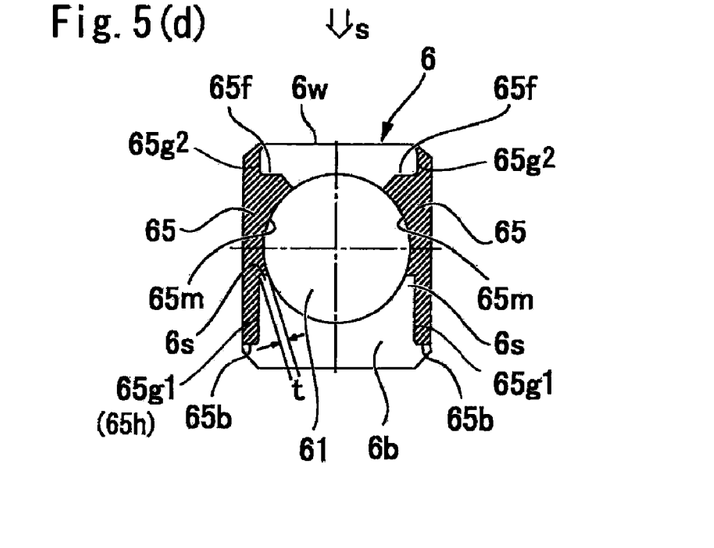
FIG. 5(d) is an explanatory view showing the bearing holder which is viewed from the output side.

Further, in this embodiment, as understood by comparing FIG. 5(d) with FIG. 4(d), the recessed engaging part 65 is reached to the bearing holding hole 61 over a wider region on a side opposite to the slide direction "s". In other words, since the tip end part 75a of the spring part 75 of the spring member 7 presses the bearing main body 14 at the position which is shifted from the center axial line in the slide direction "s", the recessed engaging part 65 is not formed on a side where a lateral pressure due to the pressing force is applied to the bearing holding hole 61, that is, the recessed engaging part 65 is not formed on a side in the slide direction "s" and thus the bearing main body 14 can be stably held in the bearing holding hole 61. In addition, the portion corresponding to the portion 6s like the structure shown in FIG. 4(d) whose width is narrow and extended longer on an opposite side in the slide direction "s" is not formed and the corresponding portion is formed as the cut-out part 65m. Therefore, since the portion whose accuracy in dimension and shape is easily lowered is reduced, accuracy in dimension and shape of the bearing holding hole 61 is prevented from being deteriorated securely.

Third Embodiment

In the above-mentioned first and second embodiments, it is structured that the spring member is mounted on the bearing holder from a direction crossing in the axial line direction of the motor. However, in the third embodiment, as described below with reference to FIGS. 6(a) through 6(f), the spring member is mounted on the bearing holder from the axial line direction of the motor.

Figure 6A:
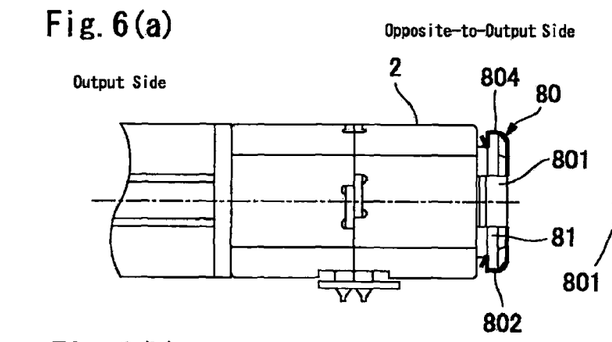
FIGS. 6(a) through 6(f) are explanatory views showing a motor in accordance with a third embodiment of the present invention.
Figure 6B:
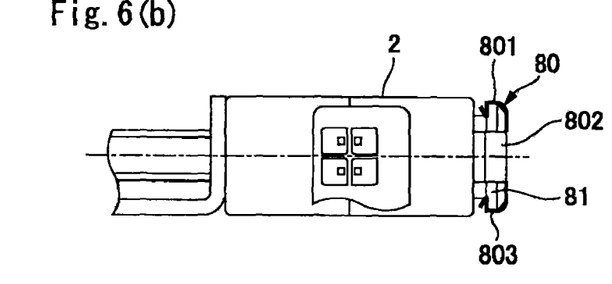
Figure 6C:
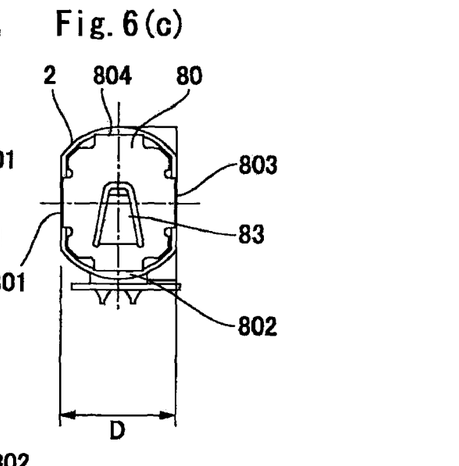
Figure 6D:
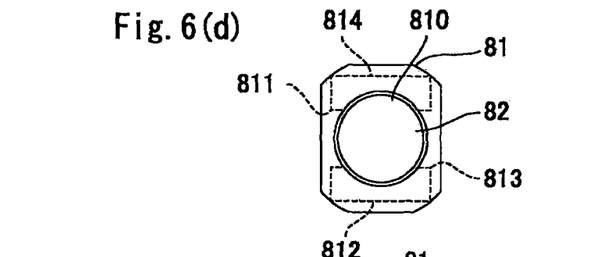
Figure 6E:
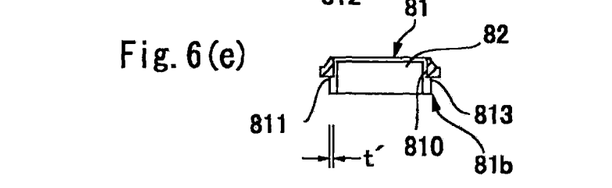
Figure 6F:
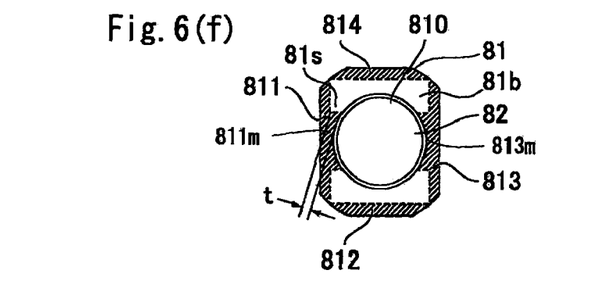

FIGS. 6(a) through 6(f) are explanatory views showing a motor in accordance with a third embodiment of the present invention. FIG. 6(a) is a plan view showing an end part of the motor, FIG. 6(b) is its front view, FIG. 6(c) is a side view showing an end part on the opposite-to-output side of the motor, FIG. 6(d) is an explanatory view showing an opposite-to-output side end face of a bearing holder, FIG. 6(e) is a cross-sectional view showing the bearing holder, and FIG. 6(f) is an explanatory view showing an end face on the output side of the bearing holder.

The motor shown in FIGS. 6(a) through 6(c) includes a case 2 in which a rotor and coils are accommodated, a bearing 82 for receiving a shaft end of a rotation shaft of the rotor at a position on one end side of the case 2, and a bearing holder 81 provided with a bearing holding hole 810 into which the bearing 82 is inserted. Further, a spring member 80 provided with a plate spring part 83 for urging the bearing 82 within the bearing holding hole 810 toward the rotation shaft is disposed on the opposite-to-output side of the bearing holder 81.

In order to mount the spring member 80 on the bearing holder 81, the spring member 80 is formed with four hook parts 801, 802, 803 and 804, which are extended around outer peripheral side faces of the bearing holder 81 at roughly their center positions to engage with the bearing holder 81, and recessed engaging parts 811, 812, 813 and 814 (region having slanted lines in FIG. 6(f)) are formed on the output side end face 81b of the bearing holder 81 so as to engage with the hook parts 801, 802, 803 and 804 through thin portions of the bearing holder 81. Therefore, when the spring member 80 is pressed against on the opposite-to-output side of the bearing holder 81 in the axial line direction of the motor, the hook parts 801, 802, 803 and 804 are engaged with the recessed engaging parts 811, 812, 813 and 814 of the bearing holder 81 and, as a result, the spring member 80 is mounted on the bearing holder 81. In this case, when the hook parts 801, 802, 803 and 804 are further bent on inner sides a little larger in comparison with the structure that they are bent from the bottom face part at a right angle, an engaging force of the spring member 80 with the bearing holder 81 is enhanced.

In this embodiment, the recessed engaging parts 811 and 813 provided in the shorter diameter direction of the motor are extended toward the bearing holding hole 810 and reached to a part of the aperture edge of the bearing holding hole 810 to form cut-out parts 811m and 813m, which are different from the example shown in FIG. 7(a) through 7(f). Also in this case, the portion where the recessed engaging parts 811 and 813 are reached to the aperture edge of the bearing holding hole 810 (portion of the cut-out parts 811m and 813m) is set to be about ½.₅ of the entire circumference of the aperture edge of the bearing holding hole 810, which is less than ½.

Further, in the portion of the output side end face 81b of the bearing holder 81, the minimum width dimension "t" of the narrowest portion 81s between the bearing holding hole 810 and the recessed engaging parts 811 and 813 is set to be more than 0.2 mm or more.

Also in this case structured as described above, the portions of the output side end face 81b of the bearing holder 81 with which the hook parts 801, 802, 803 and 804 of the spring member 7 are engaged are formed to be the recessed engaging parts 811, 812, 813 and 814 that are formed through the thin portion of the bearing holder 6. Therefore, in the state where the spring member 7 is mounted on the bearing holder 6, a dimension of the bearing holder 81 and the spring member 807 in the axial line direction of the motor can be reduced.

Further, the recessed engaging parts 811 and 813 with which the hook parts 801 and 803 are engaged are reached to a part in the circumferential direction of the aperture edge of the bearing holding hole 810 to form the cut-out parts 811m and 813m. Therefore, even when the hook parts 801, 802, 803 and 804 are largely engaged with the bearing holder 81 to enhance the engaging force of the hook parts 801, 802, 803 and 804 with the bearing holder 81, a thin portion extending in the axial line direction of the motor is not formed between the bearing holding hole 810 and the recessed engaging parts 811 and 813 and thus a high degree of accuracy in the dimension and the shape of the bearing holding hole 810 is obtained.

Further, the recessed engaging parts 811 and 813 are partly reached to the aperture edge of the bearing holding hole 810. Therefore, portions except the cut-out parts in the entire circumference of the bearing holding hole 810 are formed with a larger thickness portion whose dimension in the axial line direction of the motor is set to be longer in the bearing holder 810 and thus a support dimension of the bearing holder 81 to the bearing 82 is set to be longer even though it is partial. Therefore, the bearing 82 does not incline within the bearing holding hole 81 carelessly.

In the embodiment described above, the recessed engaging parts 811 and 813 which are located in the shorter diameter direction of the motor are extended toward the bearing holding hole 810 to form the cut-out parts 811m and 813m. However, according to the size and the shape of the bearing holder 81, respective recessed engaging parts 811, 812, 813 and 814 may be extended toward the bearing holding hole 810 to form cut-out parts along the aperture edge of the bearing holding hole 810.

Other Embodiments

In the embodiment described above, the bearing holder 6 is made of SUS but may be made of resin. Further, in the embodiment described above, the bearing holder 6 is fixed to the stator 3 (case 2) by using spot welding, but laser welding or an adhesive may be utilized. Further, welding and an adhesive may be used together.

In the embodiment described above, at least an embodiment of the bearing structure is applied to the bearing for the shaft end on the opposite-to-output side (base end side) of the rotation shaft 41. However, the bearing structure may be applied to a bearing for a shaft end on the output side (tip end side) of the rotation shaft 41.

In the embodiment described above, the spring member 7 is mounted from the longer axis direction but the spring member may be mounted from the shorter diameter direction.

Further, in the embodiment described above, the bearing 11 is urged at its eccentric position but the bearing 11 may be urged straightly at its center.

In at least an embodiment of a motor, judging from a viewpoint of appropriately maintaining a posture of the bearing in the bearing holding hole, it is preferable that the range of the cut-out part occupied along the aperture edge of the bearing holding hole is set to be ½ or less of the entire aperture edge of the bearing holding hole and, more preferably, set to be about ½.5, and most preferably, set to be not more than ⅓.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a bearing which supports a shaft end of a rotation shaft;
   a bearing holder which is formed with a bearing holding hole on which the bearing is mounted and which penetrates in an axial line direction of the motor; and
   a spring member which is mounted on an outer end face of the bearing holder for urging the bearing toward the rotation shaft, the outer end face being a face on an opposite side to the rotation shaft;
   wherein the spring member comprises a plurality of hook parts which engages with an inner end face of the bearing holder through an outer peripheral side of the bearing holder,
   wherein a portion of the inner end face of the bearing holder with which the plurality of the hook parts engages is formed to be a recessed engaging part by forming a thin portion of the bearing holder, and the recessed engaging part includes a cut-out part which reaches to an aperture edge of the bearing holding hole.

2. The motor according to claim 1, wherein the cut-out part is formed in a range of ½ or less of an entire circumference of the aperture edge of the bearing holding hole.

3. The motor according to claim 2, wherein a minimum width dimension of a portion except the cut-out part between the bearing holding hole and the recessed engaging part of the bearing holder is 0.2 mm or more when the bearing holder is viewed in the axial line direction of the motor.

4. The motor according to claim 1, wherein the spring member is mounted on the bearing holder so as to be slid in a direction crossing the axial line direction of the motor.

5. The motor according to claim 4, wherein
   a middle portion in a slide direction of the recessed engaging part is formed to reach to the aperture edge of the bearing holding hole to form the cut-out part, and
   the cut-out part is formed at a portion passing through a center of the bearing holding hole in a direction perpendicular to the slide direction.

6. The motor according to claim 5, wherein
   the recessed engaging part includes a straight portion which is linearly extended to be parallel to the slide direction,
   the straight portion includes a rear side straight part which is located on a rear side in the slide direction and a front side straight part which is located on a front side in the slide direction, and the rear side straight part and the front side straight part are formed at separated positions from each other so as to have the cut-out part there between.

7. The motor according to claim 6, wherein a width dimension of the straight portion in the direction perpendicular to the slide direction of the recessed engaging part is set to be narrower than a width dimension of a portion of the recessed engaging part where the cut-out part is formed, and the bearing is located on an inner side with respect to the straight portion in the direction perpendicular to the slide direction.

8. The motor according to claim 5, wherein the spring member includes a spring part which is cut in a tongue-like shape and is extended in the slide direction, and the spring part presses the bearing at a position which is shifted in the slide direction from a center axial line of the bearing.

9. The motor according to claim 8, wherein the cut-out part is formed in a larger range on an opposite side in the slide direction, the opposite side being a shifted side where the spring part is abutted, and the bearing is urged by the spring part in a state where a lateral pressure is applied to the bearing holding hole on the shifted side in the slide direction.

10. The motor according to claim 4, wherein a guide part for guiding the hook part when the spring member is made to slide is formed by using at least a part of a stepped part that is formed through the recessed engaging part on the inner end face of the bearing holder.

11. The motor according to claim 10, wherein the guide part is extended to be parallel to a sliding direction of the spring member.

12. The motor according to claim 10, wherein the guide part is formed on a rear end side in a slide direction of the spring member.

13. The motor according to claim 1, wherein the spring member is mounted on the bearing holder from an axial line direction of the motor.

* * * * *